(12) United States Patent
Sekine et al.

(10) Patent No.: US 12,328,419 B2
(45) Date of Patent: Jun. 10, 2025

(54) CONTROL DEVICE AND RECORDING MEDIUM

(71) Applicant: FUJIFILM CORPORATION, Tokyo (JP)

(72) Inventors: Yoshihiro Sekine, Kanagawa (JP); Yu Mishima, Kanagawa (JP); Yuki Shimizu, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/520,959

(22) Filed: Nov. 28, 2023

(65) Prior Publication Data

US 2024/0098194 A1 Mar. 21, 2024

Related U.S. Application Data

(63) Continuation of application No. 17/846,054, filed on Jun. 22, 2022, now Pat. No. 11,936,822, which is a
(Continued)

(30) Foreign Application Priority Data

Dec. 27, 2019 (JP) ................................. 2019-239029

(51) Int. Cl.
*G06F 3/0482* (2013.01)
*H04N 1/00* (2006.01)

(52) U.S. Cl.
CPC ....... *H04N 1/00506* (2013.01); *G06F 3/0482* (2013.01); *H04N 1/00427* (2013.01)

(58) Field of Classification Search
CPC ........... H04N 1/00506; H04N 1/00427; H04N 1/00517; H04N 1/00474; G06F 3/0482; G06F 3/0485; G06F 3/04883
See application file for complete search history.

(56) References Cited

U.S. PATENT DOCUMENTS 5,819,200 A 10/1998 Tamai et al.
5,832,408 A 11/1998 Tamai et al.
(Continued)

FOREIGN PATENT DOCUMENTS

JP H09-229708 A 9/1997
JP 2006-185351 A 7/2006
(Continued)

OTHER PUBLICATIONS

Norbert Gostischa: "Windows 10 Quick Access—Rearranging Folder Layout", Sep. 28, 2015, XP093042136, Retrieved from the Internet: URL:https://www.youtube.com/watch?v=-rabeaFttvE [retrieved on Apr. 25, 2023].
(Continued)

*Primary Examiner* — Hien L Duong
(74) *Attorney, Agent, or Firm* — SOLARIS Intellectual Property Group, PLLC

(57) ABSTRACT

A control device includes a processor that controls display of a task selection screen which is a task selection screen for selecting one task item from a plurality of task items and in which a priority list, which is a list of preset task items, and a history list, which includes histories of task items executed in the past, are displayed in parallel, in which the processor is configured to integrally scroll through the priority list and the history list in a case in which a scrolling operation has been performed for the priority list or the history list.

12 Claims, 14 Drawing Sheets

Related U.S. Application Data continuation of application No. PCT/JP2020/049164, filed on Dec. 28, 2020.

(56) References Cited

U.S. PATENT DOCUMENTS

| | | | |
|---|---|---|---|
| 5,987,375 A | | 11/1999 | Tamai |
| 9,436,352 B2 * | | 9/2016 | Eim .................. G06F 3/0482 |
| 10,545,709 B2 | | 1/2020 | Inoue |
| 11,611,675 B2 * | | 3/2023 | Noda ................. H04N 1/0097 |
| 11,722,610 B2 * | | 8/2023 | Chiba ............... H04N 1/00389 |
| | | | 358/1.15 |
| 2008/0216005 A1 | | 9/2008 | Bamba et al. |
| 2009/0198838 A1 | | 8/2009 | Murata et al. |
| 2013/0163023 A1 | | 6/2013 | Tomono |
| 2015/0055197 A1 | | 2/2015 | Romanoff et al. |
| 2015/0143282 A1 | | 5/2015 | Telang et al. |
| 2015/0199082 A1 | | 7/2015 | Scholler et al. |
| 2015/0222770 A1 | | 8/2015 | Yoshida |
| 2018/0220015 A1 | | 8/2018 | Akuzawa |
| 2019/0089850 A1 | | 3/2019 | Tojo et al. |
| 2019/0245989 A1 | | 8/2019 | Yoshida |
| 2019/0306343 A1 | | 10/2019 | Kado |
| 2019/0306349 A1 | | 10/2019 | Shino et al. |
| 2019/0332333 A1 | | 10/2019 | Shogaki |
| 2019/0373120 A1 | | 12/2019 | Tojo et al. |
| 2019/0379799 A1 | | 12/2019 | Shogaki |
| 2019/0384552 A1 | | 12/2019 | Sakaguchi |
| 2020/0034097 A1 | | 1/2020 | Omori |
| 2020/0092432 A1 | | 3/2020 | Masuko |
| 2020/0159479 A1 * | | 5/2020 | Yoshida ................. G06F 3/1208 |
| 2020/0296238 A1 | | 9/2020 | Nishiyama |
| 2021/0160387 A1 | | 5/2021 | Nakagawa |

FOREIGN PATENT DOCUMENTS

| | | |
|---|---|---|
| JP | 2007-142912 A | 6/2007 |
| JP | 2009-182765 A | 8/2009 |
| JP | 2013-47923 A | 3/2013 |
| JP | 2014-093029 A | 5/2014 |
| JP | 2018-112960 A | 7/2018 |
| JP | 2018-125686 A | 8/2018 |
| JP | 2019-57012 A | 4/2019 |
| JP | 2019-119139 A | 7/2019 |
| JP | 2019-181699 A | 10/2019 |
| JP | 2019-188719 A | 10/2019 |
| JP | 2019-192066 A | 10/2019 |
| JP | 2019-209666 A | 12/2019 |

OTHER PUBLICATIONS

Mike: "Microsoft mit Details zum "Quick Access" unter Windows 10—Deskmodder_de", Jun. 10, 2015, pp. 1-8, XP093042155, Retrieved from the Internet: URL:https://www.deskmodder.de/blog/2015/06/10/microsoft-mit-details-zum-quick-access-unter-windows-10/ [retrieved on Apr. 25, 2023].

Anonymous: "How to customize or disable Quick Access in Windows 10—SimpleHow", Aug. 12, 2015, pp. 1-6, XP093042188, https://www.simplehow.tips/a/17/how-to-customize-or-disable-quick-access-in-windows10 Retrieved from the Internet: URL:https://web.archive.org/web/20150812001146/https://www.simplehow.tips/a/17/how-to-customize-or-disable-quick-access-in-windows10 [retrieved on Apr. 25, 2023].

Extended European Search Report dated May 8, 2023, issued in corresponding EP Patent Application No. 20907362.6.

Non-Final Office Action issued by USPTO on Apr. 24, 2023, in related U.S. Appl. No. 17/846,054.

Notice of Allowance issued by USPTO on Sep. 13, 2023, in related U.S. Appl. No. 17/846,054.

English language translation of the following: Office action dated Jan. 9, 2024 from the JPO in a Japanese patent application No. 2021-567767 corresponding to the instant patent application. This office action translation is submitted now in order to supplement the understanding of the cited references which are being disclosed in the instant Information Disclosure Statement.

English language translation of the following: Explanation Document Regarding Expedited Examination dated Nov. 20, 2024 from the JPO in a Japanese patent application No. 2024-109810 corresponding to the instant patent application.

English language translation of the following: Office action dated Dec. 17, 2024 from the JPO in a Japanese patent application No. 2024-109810 corresponding to the instant patent application. This office action translation is submitted now in order to supplement the understanding of the cited references which are being disclosed in the instant Information Disclosure Statement.

* cited by examiner

CONTROL DEVICE AND RECORDING MEDIUM

CROSS-REFERENCE TO RELATED APPLICATIONS

This application is a continuation application of, and claims priority to, U.S. application Ser. No. 17/846,054, filed Jun. 22, 2022, which is a continuation application of International Application No. PCT/JP2020/049164, filed Dec. 28, 2020, the disclosures of which are incorporated herein by reference in its their entireties. Further, this application claims priority from Japanese Patent Application No. 2019-239029, filed Dec. 27, 2019, the disclosure of which is incorporated herein by reference in its entirety.

FIELD

Technical Field

The technology of the present disclosure relates to a control device and a recording medium.

Background Art

As an information apparatus, a so-called multi-function peripheral that executes a plurality of functions such as a copy function, a scanning function, a facsimile function, and a printing function is known. A technology in which tasks used in the past are displayed as a history list has been widely used in order to enable easy and quick selection of a function to be executed by such an information apparatus such as a multi-function peripheral. There is also a technology in which a task with a particularly high execution frequency is preferentially displayed.

Japanese Patent Application Laid-Open (JP-A) No. 2006-185351 describes that display means that displays a list of menu items recorded in history information and execution means that executes, in a case where a menu item displayed in the list by the display means is selected, processing associated with the selected menu item are included, and a fixed menu item and a history menu item that are frequently executed are displayed on the same screen.

In the technology disclosed in JP-A No. 2006-185351, the fixed menu item and the history menu item are displayed in separate regions, respectively, and it is necessary to separately scroll through the fixed menu items and the history menu items when selecting a menu item. Therefore, it is necessary to select which menu items to scroll through.

Here, even in a case where it is necessary to separately scroll through a priority list (corresponding to the fixed menu) that is a list of preset task items and a history list (corresponding to the history menu item) that includes task items executed in the past, it is necessary to select which list to scroll through.

SUMMARY

An object of the technology of the disclosure is to provide a control device and a control program capable of eliminating the need to select which of a priority list and a history list to scroll through.

Solution to Problem

A first aspect is a control device including a processor that controls display of a task selection screen which is a task selection screen for selecting one task item from a plurality of task items and in which a priority list, which is a list of preset task items, and a history list, which includes histories of task items executed in the past, are displayed in parallel, in which the processor is configured to integrally scroll through the priority list and the history list in a case in which a scrolling operation has been performed for the priority list or the history list.

A second aspect is a recording medium storing a control program for causing a computer to perform processing of integrally scrolling through, in a task selection screen which is a task selection screen for selecting one task item from a plurality of task items and in which a priority list, which is a list of preset task items, and a history list, which includes histories of task items executed in the past, are displayed in parallel, the priority list and the history list in a case in which a scrolling operation has been performed for the priority list or the history list.

DETAILED DESCRIPTION

Hereinafter, an example of an embodiment of the technology of the present disclosure will be described with reference to the drawings.

(Multi-Function Peripheral 100)

Figure 1:
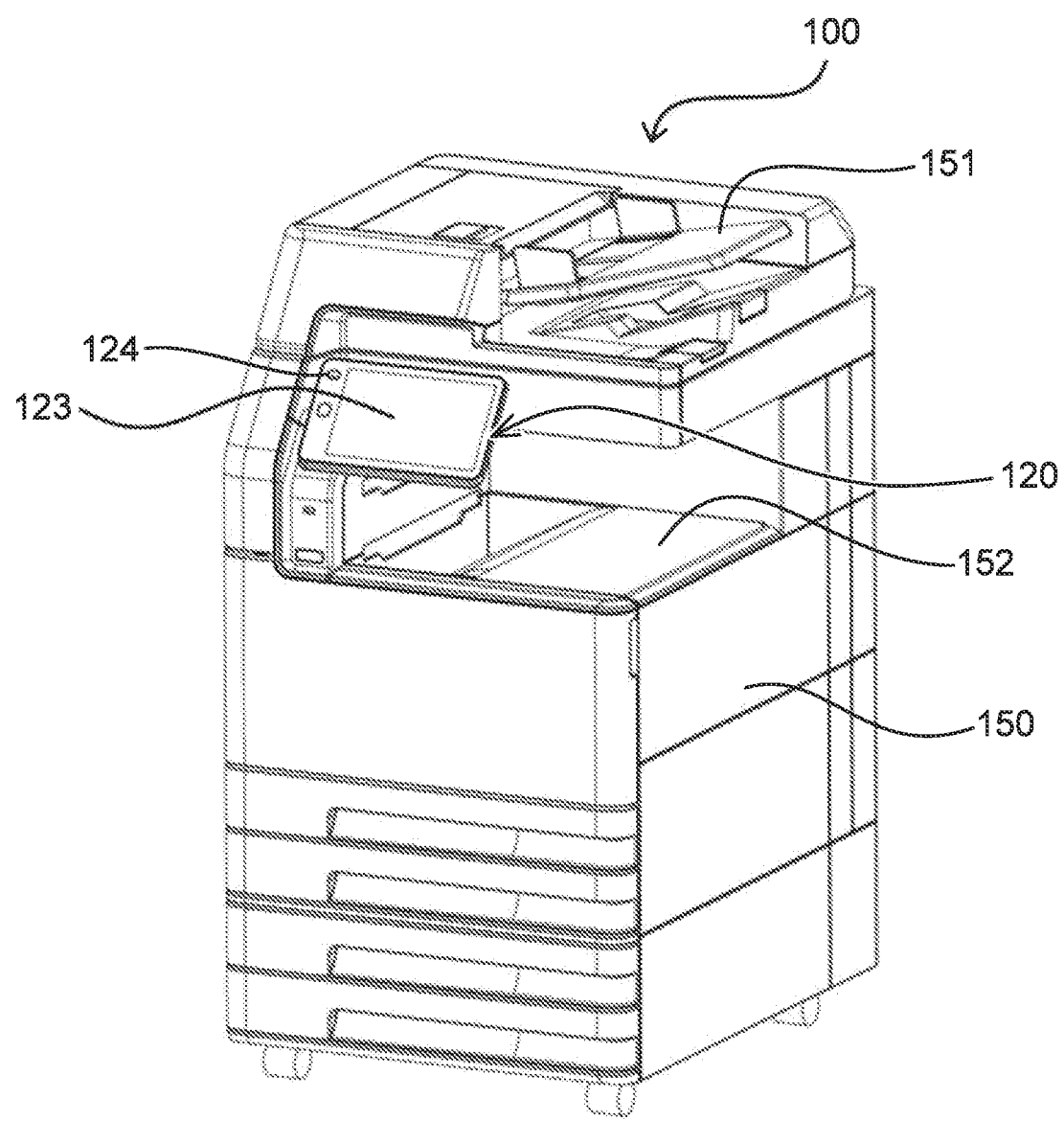
FIG. 1 is an exterior view of a multi-function peripheral.
Figure 2:
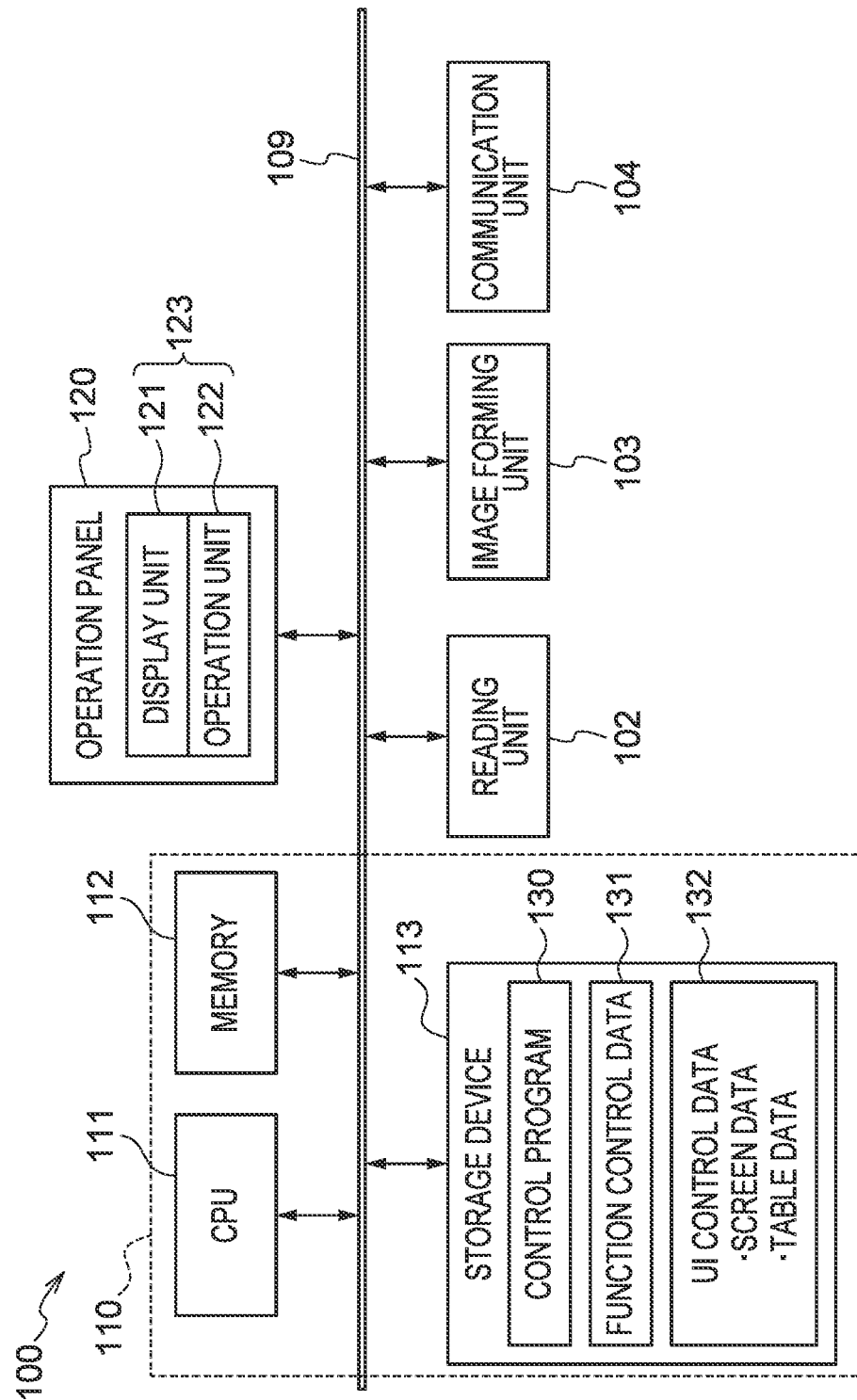
FIG. 2 is a block diagram illustrating a hardware configuration of the multi-function peripheral.

FIG. 1 is a view illustrating an appearance of the multi-function peripheral 100 according to the present embodiment. FIG. 2 is a block diagram illustrating a hardware configuration of the multi-function peripheral 100.

The multi-function peripheral 100 illustrated in FIGS. 1 and 2 is a device capable of executing processing for functions such as copying, printing, scanning, and facsimile. As illustrated in FIG. 2, the multi-function peripheral 100 includes a control device 110, a reading unit 102, an image forming unit 103, and a communication unit 104 in a main body 150. Note that the multi-function peripheral 100 is an example of the information apparatus. The multi-function peripheral 100 can perform data communication with an information processing apparatus such as a personal computer or a server in an office connected to a local area network (LAN) line or the like or perform facsimile communication with a communication apparatus in another office through a public line such as a telephone line. Therefore, the multi-function peripheral 100 is also an example of the information communication apparatus.

An operation panel 120, the control device 110 including a storage device 113, the reading unit 102, the image forming unit 103, and the communication unit 104 are mutually connected by a bus 109. Each unit of the multi-function peripheral 100 will be described below.

(Reading Unit 102, Image Forming Unit 103, and Communication Unit 104)

The reading unit 102 reads an image of a document. Specifically, the reading unit 102 generates image data by optically reading an image of a document and converting the image into a digital signal.

The image forming unit 103 forms an image on a medium such as a paper sheet. Specifically, the image forming unit 103 forms an image on a medium by, for example, an electrophotographic method in which an image is formed by electrostatically attaching a toner onto a paper sheet. Note that the image forming unit 103 may form an image on a medium by another method such as an inkjet method in which an image is formed by ejecting an ink onto a paper sheet.

The communication unit 104 communicates with an external device such as another facsimile device. Specifically, the communication unit 104 transmits and receives various pieces of data to and from an external device by communication using various wired or wireless communication lines. Examples of the communication line include the Internet, an intranet, and a public telephone line.

For example, the multi-function peripheral 100 includes a document feeding device 151 provided at an upper portion of the main body 150 as illustrated in FIG. 1. The document feeding device 151 feeds a document to a document reading stage (not illustrated) disposed on an upper surface of the main body 150. The reading unit 102 is disposed at a position facing the reading stage in the main body 150. The document feeding device 151 can be lifted up. As the document feeding device 151 is lifted up, the reading stage is exposed and can be used as a so-called flatbed type. Therefore, a user can directly set a document on the reading stage without using the document feeding device 151.

An image of a document is read by the reading unit 102, and image data is generated. In a case where processing related to the copy function is executed in the multi-function peripheral 100, the image forming unit 103 prints an image of a document on another paper sheet based on image data generated by the reading unit 102. The paper sheet on which an image is printed is discharged to a paper sheet discharging unit 152 provided in the main body 150. In a case where processing related to the facsimile function is executed in the multi-function peripheral 100, image data generated by the reading unit 102 is output to the communication unit 104 and transmitted to a destination via the communication unit 104. In a case where processing related to the printing function is executed in the multi-function peripheral 100, the image forming unit 103 prints an image on a paper sheet based on image data input from a personal computer or the like. The paper sheet on which an image is printed is discharged to the paper sheet discharging unit 152.

In addition, a feeding unit in which a paper sheet is loaded, a paper sheet transport mechanism that transports a paper sheet to the image forming unit 103 and the paper sheet discharging unit 152, and the like are provided inside the main body 150.

(Operation Panel 120)

The multi-function peripheral 100 includes the operation panel 120 for a user to operate the multi-function peripheral 100. The operation panel 120 is an example of a user interface. The user interface is a device for exchanging information between the multi-function peripheral 100 and a user, specifically, for inputting an operation instruction from a user to the multi-function peripheral 100 or displaying information such as a status of the multi-function peripheral 100 to a user.

Figure 3:
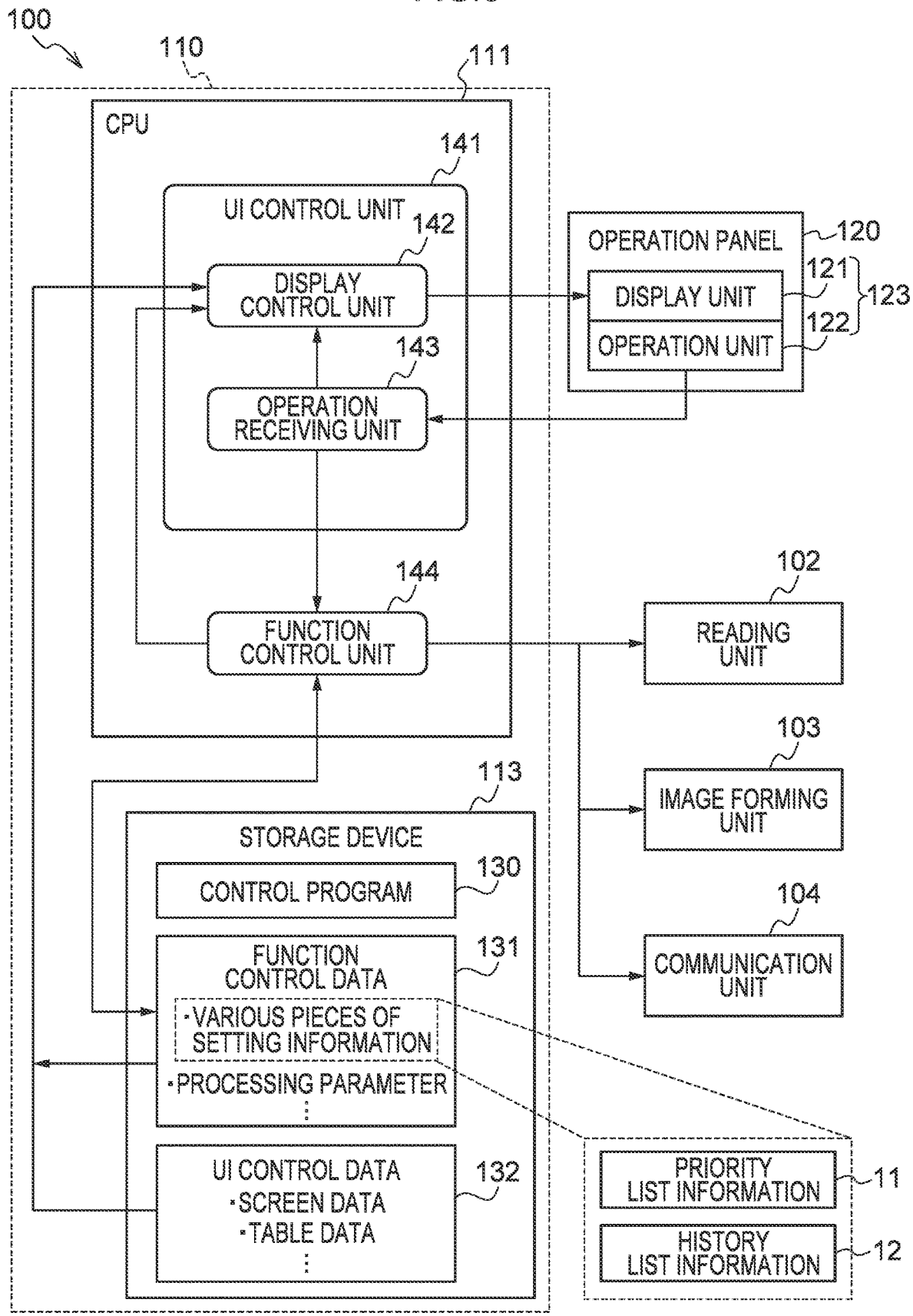
FIG. 3 is a block diagram illustrating a functional configuration of a control device.

In the present embodiment, specifically, the operation panel 120 includes a display unit 121 and an operation unit 122 as illustrated in FIGS. 2 and 3.

The display unit 121 displays an operation screen, various messages such as operation guidance, and the like. The operation unit 122 is a component on which a user performs an input operation. The display unit 121 is implemented by, for example, a liquid crystal display, an organic electro luminescence (EL) display, or the like. The operation unit 122 and the display unit 121 are implemented by a touch panel display 123 in which both the operation unit 122 and the display unit 121 are integrated. The operation unit 122 is a resistive type touch panel, a capacitive type touch panel, or the like, and detects a touch operation of a user. A region where an operation screen of the display unit 121 is displayed and a region where a touch operation of the operation unit 122 can be detected overlap with each other in the touch panel display 123. As a result, once a user performs a touch operation on an operation screen displayed on the display unit 121, the operation unit 122 detects the touch operation performed on the operation screen and a position at which the touch operation is performed on the operation screen, and outputs a detection signal to the control device 110.

Examples of the touch operation of the user include operations such as tapping, flicking, sliding, and dragging. The tapping operation is an operation of touching the screen of the display unit 121 with a finger. The flicking operation is an operation of touching the screen of the display unit 121 in such a way as to flick the screen with a finger. The sliding operation is an operation of moving a finger in a state of touching the screen of the display unit 121 with the finger. The dragging operation is an operation for moving an image such as an icon displayed on the display unit 121. The dragging operation is an operation of touching an image displayed on the display unit 121 with a finger, then moving the finger touching the image, and then releasing the finger from the image. The operation unit 122 that is a touch panel outputs, as a detection signal, a movement locus of a finger associated with these touch operations in an operation screen. Note that the touch operation may be not only an operation using a finger of a user but also an operation using a tool such as a touch pen.

The operation panel 120 further includes an operation key 124 disposed outside the screen of the display unit 121 as illustrated in FIG. 1. Examples of the operation key 124 include a power key for supplying power to the multi-function peripheral 100, a cancel key for canceling various executions, and the like. As described above, the operation panel 120 according to the present embodiment includes a mechanical operation unit in addition to the touch panel display 123 including the operation unit 122.

Figure 4:
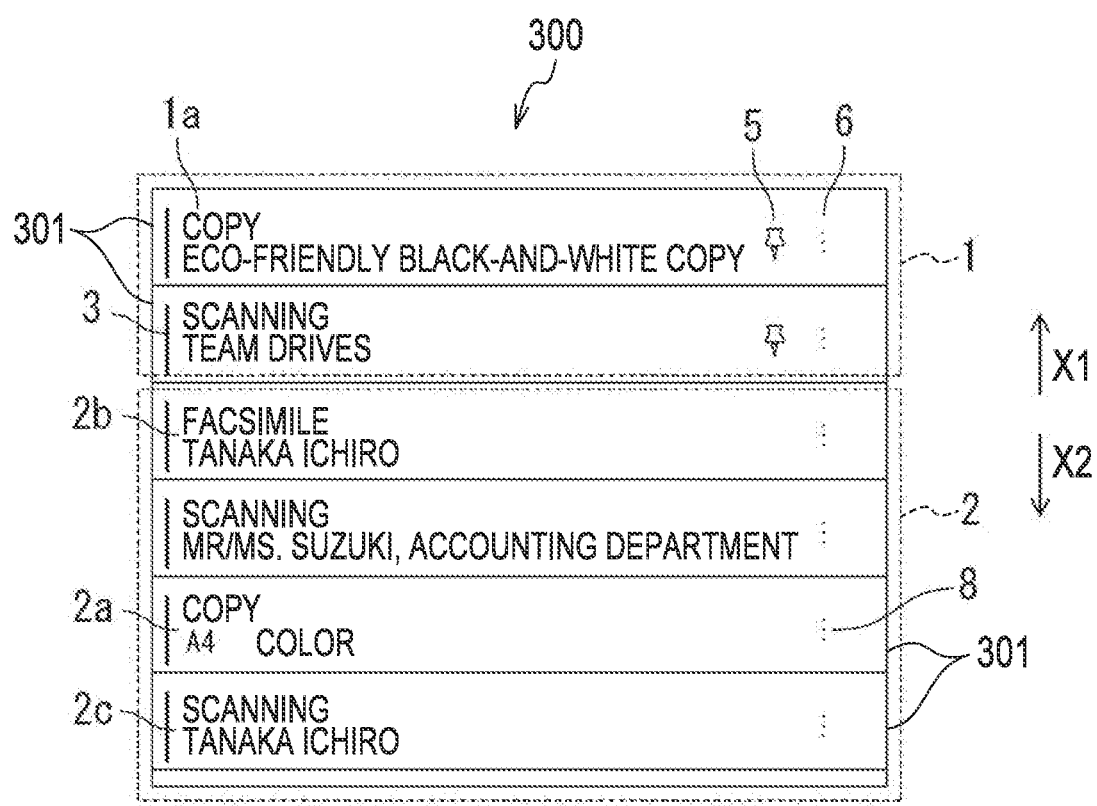
FIG. 4 is a view illustrating a task selection screen.
Figure 5:
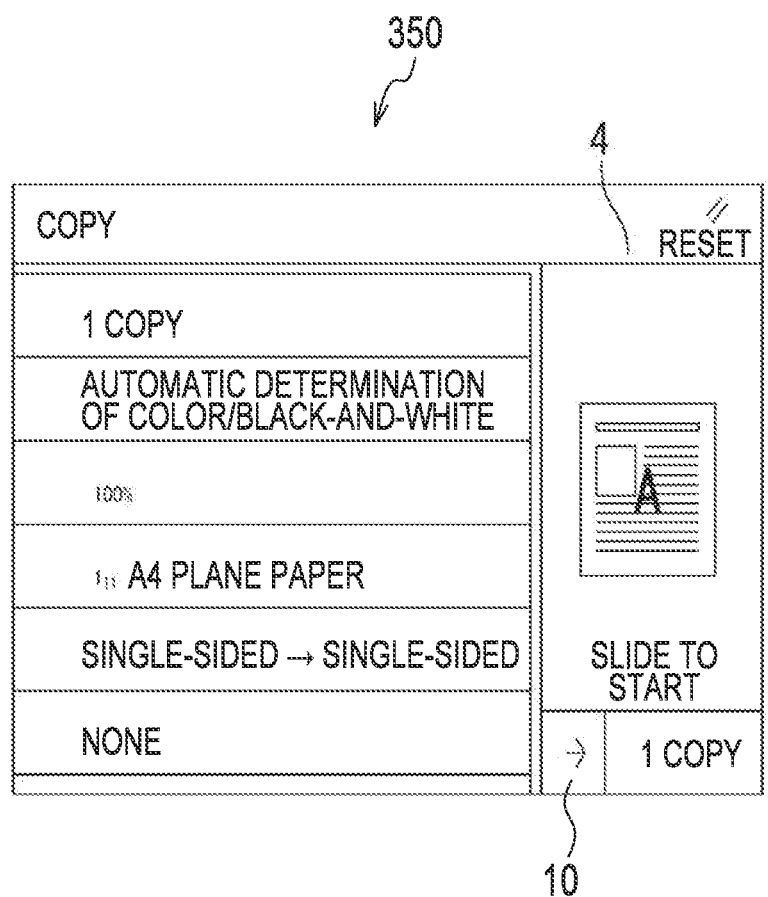
FIG. 5 is a view illustrating a task execution screen.

In the present embodiment, the display unit 121 can display various operation screens such as a task selection screen 300 illustrated in FIG. 4 and a task execution screen 350 illustrated in FIG. 5, for example. Details of the task selection screen 300 and the task execution screen 350 will be described later.

(Control Device 110)

The control device 110 is a device that controls each unit of the multi-function peripheral 100 including the operation panel 120. Specifically, the control device 110 includes a central processing unit (CPU) 111, a memory 112, and a storage device 113 as illustrated in FIG. 2. The control device 110 controls the multi-function peripheral 100 based on information stored in the storage device 113.

The storage device 113 stores various programs including a control program 130 and various pieces of data including function control data 131 and user interface (UI) control data 132. The control program 130 is a program that causes a computer including the CPU 111 to function as the control device 110. The function control data 131 is data used to control the reading unit 102, the image forming unit 103, and the communication unit 104, and includes various pieces of setting information, processing parameters, and the like. The processing parameter is, for example, a parameter used when image correction processing such as gain correction, contrast correction, white balance correction, or gamma correction is executed.

The various pieces of setting information include setting information that specifies processing conditions for each of the copy function, the scanning function, the printing function, and the like implemented by the reading unit 102, the image forming unit 103, and the communication unit 104. For example, in the case of the copy function and the printing function, the setting information is setting information that specifies processing conditions such as paper sheet size setting and color setting (for example, black-and-white copy or color copy), and in the case of the scanning function, the setting information is setting information that specifies processing conditions such as reading resolution setting and color setting (for example, black-and-white reading or color reading). The setting information includes user setting information set by a user in addition to initial setting information. The various pieces of setting information also include a history of user setting information used by a user in the past.

The UI control data 132 includes various pieces of screen data for configuring an operation screen displayed by the display unit 121 and various pieces of table data defining various setting items and the like displayed in an operation screen. Specifically, the storage device 113 is implemented by a recording device such as a hard disk drive (HDD), a solid state drive (SSD), or a flash memory.

The memory 112 is a work area for the CPU 111 to execute various programs, and temporarily records various programs or various pieces of data when the CPU 111 executes processing. The CPU 111 reads various programs including the control program 130 from the storage device 113 to the memory 112, and executes the program by using the memory 112 as a work area.

In the control device 110, the CPU 111 executes the control program 130 to implement various functions for controlling the multi-function peripheral 100. Hereinafter, a functional configuration implemented by cooperation of the CPU 111 as a hardware resource and the control program 130 as a software resource will be described. FIG. 3 is a block diagram illustrating a functional configuration of the CPU 111, and is a block diagram mainly illustrating a functional configuration that implements control of the operation panel 120.

As illustrated in FIG. 3, in the control device 110, the CPU 111 functions as a UI control unit 141 and a function control unit 144 by executing the control program 130.

The function control unit 144 controls the reading unit 102, the image forming unit 103, and the communication unit 104 while referring to the function control data based on an operation instruction input from the UI control unit 141. In addition, the function control unit 144 outputs, to the UI control unit 141, a processing execution result in the reading unit 102, the image forming unit 103, and the communication unit 104, a status, and the like.

The UI control unit 141 receives an operation instruction input from the operation panel 120 and outputs the received operation instruction to the function control unit 144. The UI control unit 141 controls the touch panel display 123. The UI control unit 141 includes a display control unit 142 and an operation receiving unit 143 as the functional configuration.

The operation receiving unit 143 receives an operation instruction according to a user's operation input from the operation panel 120, the user's operation input including a user's touch operation detected by the operation unit 122 of the touch panel display 123.

The display control unit 142 performs control to display various operation screens on the display unit 121 of the touch panel display 123 with reference to the function control data 131 and the UI control data 132.

Specifically, once the operation receiving unit 143 receives an operation of supplying power to the multi-function peripheral 100, the display control unit 142 causes the display unit 121 to display the task selection screen 300 (see FIG. 4) as a top screen, as an example. The task selection screen 300 is a screen for a user to select and operate a task item 301 (see FIG. 4) to be executed by the multi-function peripheral 100. Here, a task is processing executed by the multi-function peripheral 100 after a user sets a processing condition for a main function of the multi-function peripheral 100. Then, an item including information indicating the content of this processing is referred to as the task item 301. For example, in the case of the copy function, which is one of the main functions of the multi-function peripheral 100, processing executed by the multi-function peripheral 100 after a user sets the processing conditions such as paper sheet size setting and color setting is the task of the copy function, and an item indicating the content of the task is the task item 301. Similarly, in the case of the scanning function, processing executed by the multi-function peripheral 100 after a user sets the processing conditions such as reading resolution setting and color setting is the task of the scanning function, and an item indicating the content of the task is the task item 301.

As described above, there are various types of tasks and task items 301 indicating the contents of the tasks according to the type of function and the processing condition. A plurality of task items 301 for different types of functions and different processing conditions are displayed in the task selection screen 300. The task selection screen 300 is a selection screen for selecting one task item 301 from the plurality of task items 301 in the case of causing the multi-function peripheral 100 to execute one task.

Various pieces of setting information of the function control data 131 include priority list information 11 and history list information 12. The storage device 113 is a priority list recording unit in which the priority list information 11 is recorded and a history list recording unit in which the history list information 12 is recorded. The priority list information 11 is information in which a plurality of preset task items 301 are recorded. The task items 301 included in the priority list information 11 include, for example, task items that are preset due to a high execution frequency. The task items 301 included in the priority list information 11 may be initially set at the time of product shipment or may be set by a user.

The history list information 12 is information in which histories of the task items 301 executed in the past by the multi-function peripheral 100 are recorded. The name of each task item 301, an arrangement order, and the like are recorded in the priority list information 11. The name of each task item 301, an execution date and time when each task item 301 was executed, and the like are recorded in the history list information 12.

The display control unit 142 generates the task selection screen 300 including a priority list 1 and a history list 2 with reference to the priority list information 11 and the history list information 12. Specifically, when generating the priority list 1, the display control unit 142 generates the priority list 1 by arranging the task items 301 of the priority list 1 in order based on the name and the arrangement order of each task item 301 included in the priority list information 11. When generating the history list 2, the display control unit 142 generates the history list 2 by arranging the task items 301 of the history list 2 in order based on the name and the execution date and time of each task item 301 included in the history list information 12. The display control unit 142 displays the priority list 1 and the history list 2 in parallel in the task selection screen 300.

As a result, as illustrated in FIG. 4, the display control unit 142 displays the priority list 1 that is a list of preset task items 301, and the history list 2 that includes histories of task items 301 executed in the past in the multi-function peripheral 100, in parallel in the task selection screen 300. In FIG. 4, as an example, the priority list 1 is displayed above the history list 2 in the task selection screen 300.

The task items 301 of the history list 2 are displayed in time series based on the execution date and time of each task item 301 recorded in the history list information 12. Specifically, as an example, the task items 301 are displayed in a direction along an arrow X2 in order from a task item 301 with the latest execution date and time. Therefore, the most recently executed task item 301 is displayed at the uppermost portion of the history list 2 (that is, a position closest to an X1 direction side).

As described above, each of the plurality of task items 301 included in the priority list 1 or the history list 2 is a task item for any of the four main functions of the multi-function peripheral 100, that is, the copy function, the scanning function, the printing function, and the facsimile function. In this manner, the task item 301 registered in the priority list 1 or the history list 2 corresponds to any of the four main functions of the multi-function peripheral 100. In other words, supplementary functions of the multi-function peripheral 100 other than the main four functions are excluded from the functions registered in the priority list 1 or the history list 2. Therefore, since the task items 301 registered in the priority list 1 and the history list 2 are narrowed down to those related to main functions having a relatively high execution frequency, the priority list 1 and the history list 2 become easy to use for a user. At least one of the plurality of task items 301 registered in the priority list 1 or the history list 2 preferably includes a task item 301 for the copy function considered to have a relatively high execution frequency among the four main functions.

The task item 301 of the priority list 1 can be customized by a user. Specifically, rearrangement of the task items 301 in the priority list 1, name change, and addition of a task item 301 from the history list 2 can be made as will be described later.

The function control unit 144 adds data of an executed task item 301 to the history list information 12 every time a task item 301 is executed by the multi-function peripheral 100. In a case where the history list information 12 is updated, the display control unit 142 updates the history list 2 in the task selection screen 300.

A setting button 8 for displaying a registration menu 9 (see FIG. 10) is displayed on the right side of a task item 301 of the history list 2 in the task selection screen 300.

A pinning mark 5 indicating that it is a task item 301 of the priority list 1 and a setting button 6 for displaying a registration menu 7 (see FIG. 7) are displayed on the right side of a task item 301 of the priority list 1. The pinning mark 5 indicates it is a task item 301 whose display is not updated even when another task item is executed.

As illustrated in FIG. 4, for example, "black-and-white copy" 1a, "color copy" 2a, "facsimile" 2b, "scanning" 2c, and the like are displayed as the task items 301 in the task selection screen 300 according to the present embodiment. A user name is also displayed in the task items 301, "fax" 2b and "scanning" 2c. "Black-and-white copy" 1a having a high execution frequency is displayed in the priority list 1.

A color display portion 3 colored in a specific color is arranged on the left side of each task item 301. The color display portions 3 arranged in "black-and-white copy" 1a and "color copy" 2a, which are the same copy functions, are displayed in the same color. In other words, the plurality of task items 301 include task items for a plurality of functions selected from the four main functions of the multi-function peripheral 100, that is, the copy function, the fax function, the scanning function, and the printing function, and the task item 301 is displayed in a different color for each function in the task selection screen 300. In the present embodiment, a plurality of task items 301 corresponding to the same function are bundled as the same type of task items 301, and the same color is assigned. Task items 301 to be bundled as the same type of task items 301 are set in advance. For example, information regarding which task items 301 are set as the same type of task items 301 and which color is assigned to the task items is recorded in the table data of the UI control data 132. The display control unit 142 displays the color display portion 3 with reference to the data. By doing so, the color of the color display portion 3 is determined, and the color display portion 3 is displayed. As an example other than the example in which task items 301 for the same corresponding functions are bundled as the same type of task items 301, "fax" 2b and "scan" 2c, which are the task items 301 with the same "user", may be set as the same type of task items 301, and the same color may be assigned to these task items 301. The color of the color display portion 3 may be changed by a setting change operation performed by a user.

As described above, in the task selection screen 300, the priority list 1 and the history list 2 are displayed in the same task selection screen 300.

The task selection screen 300 may display a list for each user as the priority list 1 and the history list 2. In this case, for example, as user authentication is performed via the operation unit 122, the display unit 121 displays the priority list 1 and the history list 2 of the authenticated user in the task selection screen. In this case, the priority list information 11 is information corresponding to the priority list 1 associated with each user, and a task item 301 included in the priority list information 11 for each user can be set for each user. The history list information 12 is information corresponding to the history list 2 associated with each user, and a task item 301 included in the history list information 12 for each user is updated based on the history for each user.

Figure 6:
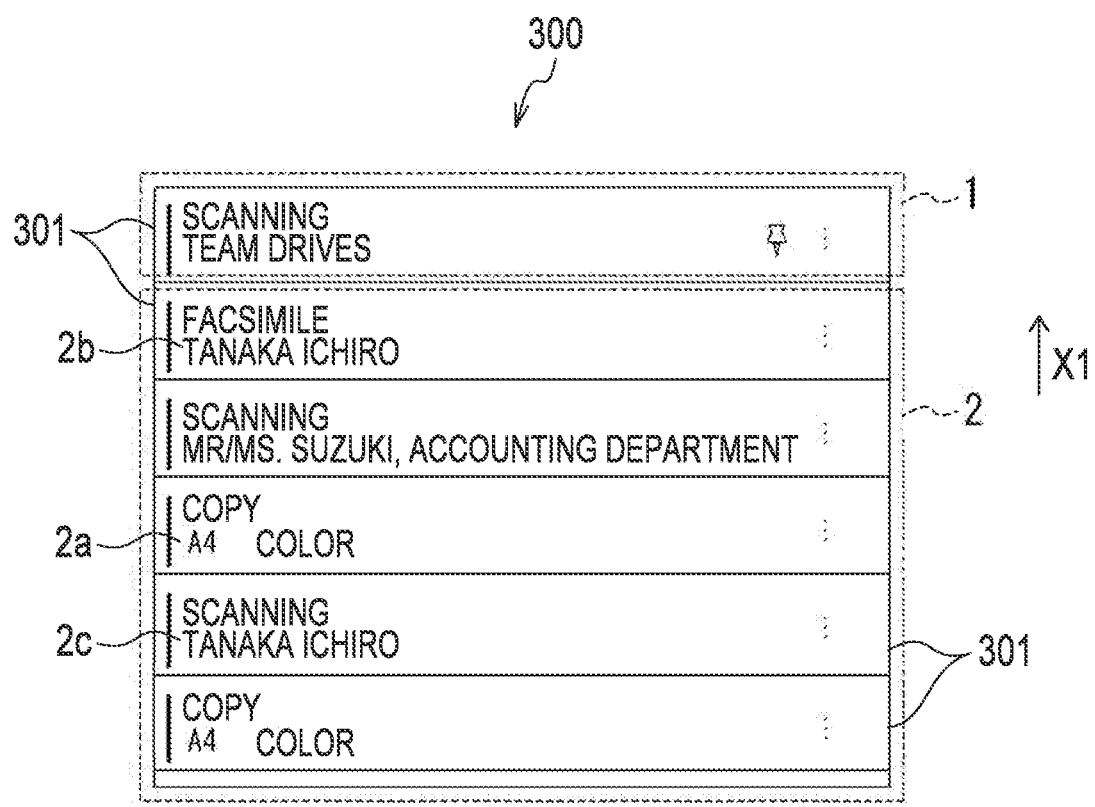
FIG. 6 is a view illustrating a state in which a priority list and a history list are scrolled.

Once the operation unit 122 detects a scrolling operation for the priority list 1 or the history list 2 in the task selection screen 300, the operation receiving unit 143 receives an operation instruction for the scrolling operation. This operation instruction is input to the display control unit 142. The display control unit 142 integrally scrolls through the priority list 1 and the history list 2 as illustrated in FIG. 6 based on the input operation instruction for the scrolling operation. Specifically, the scrolling operation is a flicking operation in a direction along an arrow X1 or a direction along an arrow X2 (see FIG. 4).

As described above, when scrolling through the two lists of the priority list 1 and the history list 2 in the task selection screen 300, the display control unit 142 integrally handles the priority list 1 and the history list 2 as an integrated list. In other words, at the time of scrolling, the priority list 1 and the history list 2 are scrolled as one integrated list without being distinguished from each other.

The scrolling operation can be performed only in the X1 direction in which the number of displayed task items 301 of the priority list 1 decreases in the state illustrated in FIG. 4 in the task selection screen 300. Therefore, only a flicking operation in the X1 direction is valid in the state illustrated in FIG. 4 in the task selection screen 300. The priority list 1 and the history list 2 can also be scrolled in the X2 direction after being scrolled in the X1 direction.

The scrolling operation for the priority list 1 and the history list 2 is performed by moving the priority list 1 and the history list 2 in the X1 direction or the X2 direction for which the flicking operation has been performed. As a result, task items 301 that have not been displayed are sequentially displayed in the task selection screen 300. FIG. 6 illustrates a state in which the priority list 1 and the history list 2 have been moved by one task item 301 in the direction along the arrow X1 in the state illustrated in FIG. 4. As described above, in the present embodiment, the priority list 1 and the history list 2 can be scrolled integrally in the scrolling of the task selection screen 300.

The setting button 6 is arranged in a task item 301 in the priority list 1. The display control unit 142 can execute one or more of deletion of a task item 301 from the priority list 1 and name change of a task item 301 based on the operation of the setting button 6.

Figure 7:
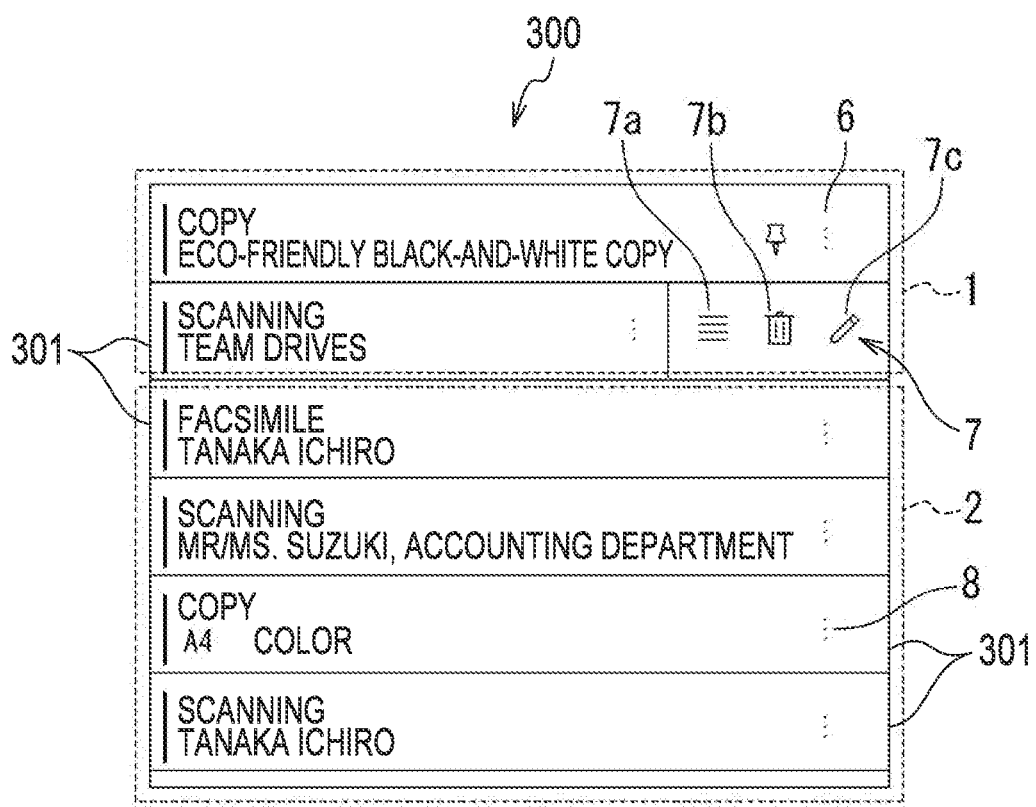
FIG. 7 is a view illustrating a state in which a setting button is displayed in a task item of the priority list.

For example, once the operation unit 122 detects an operation (specifically, a flicking operation or a tapping operation) for the setting button 6 of the priority list 1, the operation receiving unit 143 receives an operation instruction for the operation of the setting button 6. The display control unit 142 displays the registration menu 7 as illustrated in FIG. 7 based on the operation instruction received by the operation receiving unit 143. A rearrangement button 7a, a delete button 7b, and a name change button 7c of a task item 301 are arranged in the registration menu 7.

Once the operation unit 122 detects an operation (specifically, a flicking operation or a tapping operation) for the rearrangement button 7a, the operation receiving unit 143 receives an operation instruction for the operation of the rearrangement button 7a. The display control unit 142 shifts the task selection screen 300 displayed on the display unit 121 to a rearrangement mode based on the operation instruction received by the operation receiving unit 143. Once the task selection screen 300 shifts to the rearrangement mode, a moving operation (specifically, a dragging operation) for a task item 301 in the priority list 1 is enabled as indicated by an arrow A in FIG. 8.

Once the operation unit 122 detects the moving operation for a task item 301 in the priority list 1 in the task selection screen 300 in the rearrangement mode, the operation receiving unit 143 receives an operation instruction for the moving operation. The display control unit 142 changes the arrangement order of the task items 301 by moving a task item 301 in the priority list 1 based on the operation instruction received by the operation receiving unit 143.

That is, once the operation unit 122 detects a dragging operation, the display control unit 142 rewrites the arrangement order of the task items 301 recorded in the priority list information 11, and displays the priority list 1 in the rewritten arrangement order. The display control unit 142 may cancel the rearrangement mode and display the original task selection screen 300 after a predetermined time elapses.

Figure 9:
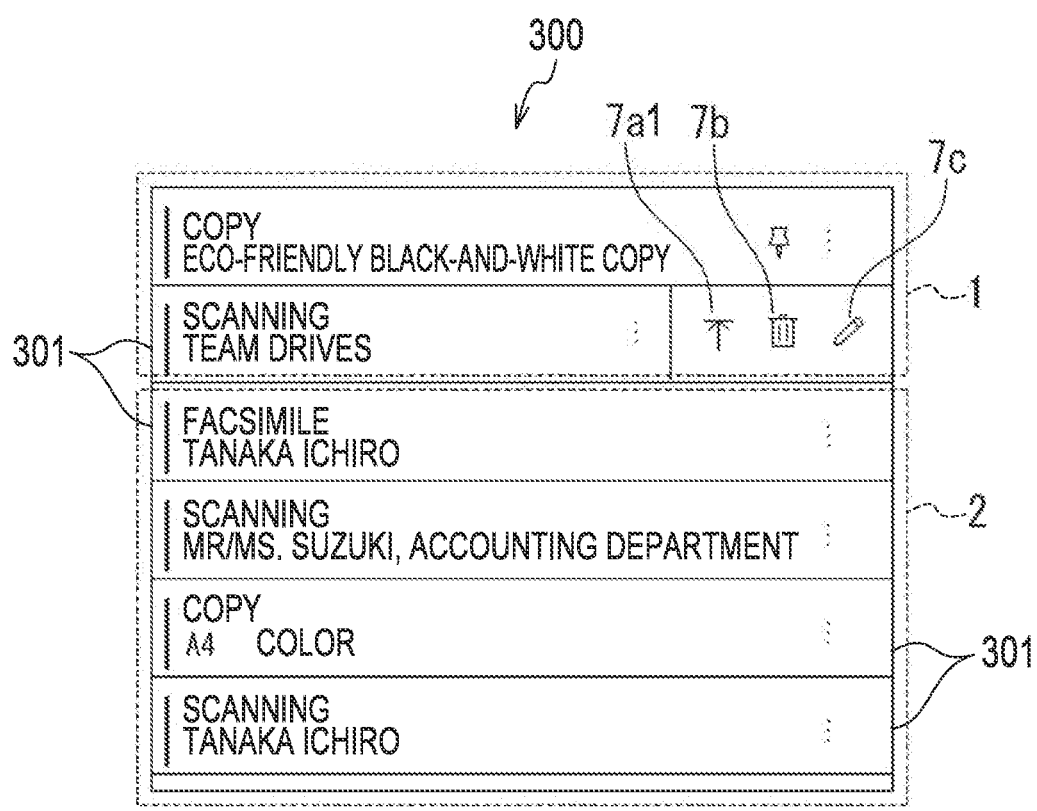
FIG. 9 is a view illustrating another example of the setting button displayed in the task item of the priority list.

A rearrangement button 7a1 (see FIG. 9) having a movement instruction function of moving a task item 301 to the uppermost portion of the priority list 1 may be used as the rearrangement button 7a. In the example illustrated in FIG. 9, once the operation unit 122 detects an operation (specifically, a flicking operation or a tapping operation) for the rearrangement button 7a1, the display control unit 142 moves a task item 301 for which the rearrangement button 7a1 has been operated to the uppermost portion of the priority list 1 and displays the priority list 1. In the example illustrated in FIG. 9, since a task item 301 can be moved without shifting to the rearrangement mode, the operation is simplified.

Once the operation unit 122 detects an operation (specifically, a flicking operation or a tapping operation) for the delete button 7b, the display control unit 142 deletes a task item 301 of the priority list 1. That is, once the operation unit 122 detects an operation for the delete button 7b, one task item 301 instructed to be deleted is deleted from the priority list information 11, and the display control unit 142 displays the priority list 1 based on the priority list information 11 after the deletion. The display control unit 142 displays the priority list 1 and the history list 2 from which a place generated due to the deletion is removed. That is, the display control unit 142 increases the number of task items 301 in the history list 2 by the number of task items 301 deleted from the priority list 1, and displays a new priority list 1 and history list 2 whose numbers of task items 301 have been changed.

Once the operation unit 122 detects an operation (specifically, a flicking operation or a tapping operation) for the name change button 7c, the display control unit 142 shifts the task selection screen 300 to a name input screen (not illustrated). Once the task selection screen 300 shifts to the name input screen, a new changed name can be input. Specifically, for example, a keyboard screen is displayed as a name input screen, and a new name can be input through the keyboard. The keyboard screen is provided with, for example, a confirm button and a cancel button.

Once the operation unit 122 detects a confirmation operation (specifically, a flicking operation or a tapping operation for the confirm button) after the input of a new name in the name input screen, the display control unit 142 changes the name of the task item 301 of the priority list 1. That is, once the operation unit 122 detects the confirmation operation after a new name is input, the display control unit 142 changes the name of a task item 301 recorded in the priority list information 11, and the display control unit 142 displays the task item 301 based on data of the changed name of the task item 301.

In this manner, setting of a task item 301 in the priority list 1 can be changed by a user. A task item 301 in the priority list 1 may be initially set at the time of product shipment. In this case, for example, the task item 301 having a high execution frequency is generally set. The initial setting information is recorded in the priority list information 11 as described above.

Figure 10:
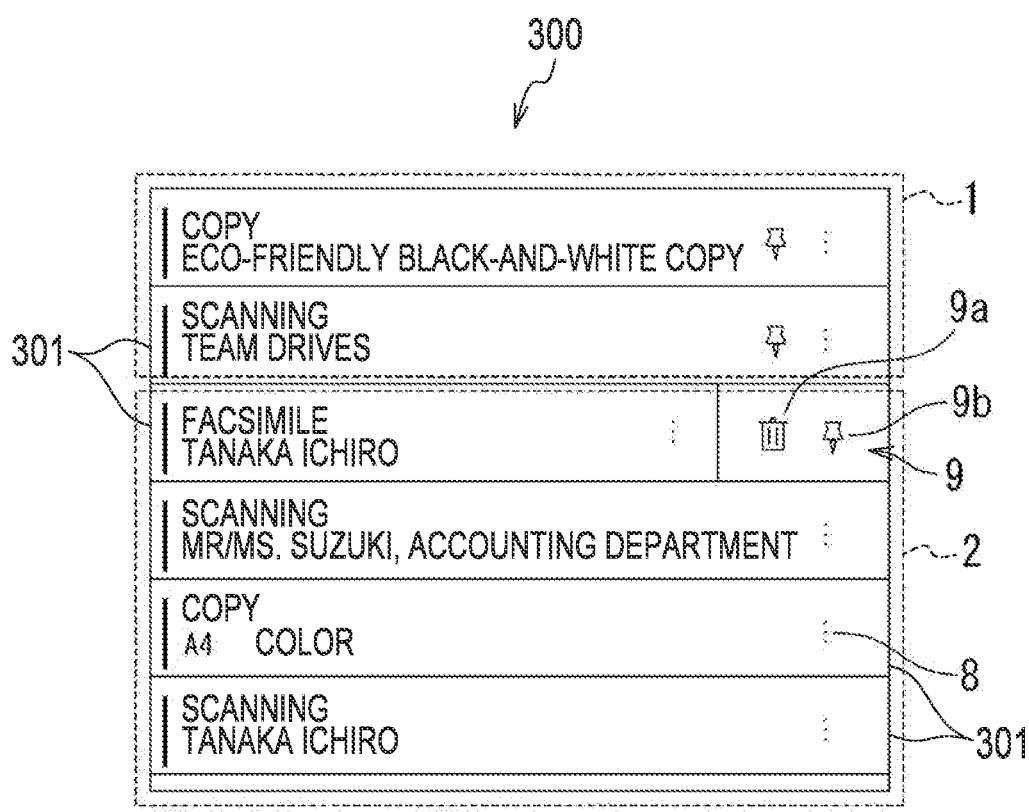
FIG. 10 is a view illustrating a state in which the setting button is displayed in a task item in the history list.

The setting button 8 is arranged in a task item 301 in the history list 2. Once the operation unit 122 detects an operation (specifically, a flicking operation or a tapping operation) for the setting button 8 of the history list 2, the display control unit 142 displays the registration menu 9 as illustrated in FIG. 10. A delete button 9*a* and a movement button 9*b* are arranged in the registration menu 9.

Once the operation unit 122 detects an operation (specifically, a flicking operation or a tapping operation) for the delete button 9*a*, the display control unit 142 deletes a task item 301 of the history list 2. That is, once the operation unit 122 detects an operation for the delete button 9*a*, one task item 301 instructed to be deleted is deleted from the history list information 12, and the display control unit 142 displays the history list 2 based on the history list information 12 after the deletion. The display control unit 142 displays the history list 2 from which a place generated due to the deletion is removed. That is, the display control unit 142 adds a hidden task item 301 to the history list 2 instead of the task item 301 deleted from the history list 2 and displays a new history list 2.

Once the operation unit 122 detects an operation (specifically, a flicking operation or a tapping operation) for the movement button 9*b*, the display control unit 142 moves a task item 301 of the history list 2 to the priority list 1. That is, once the operation unit 122 detects an operation for the movement button 9*b*, a task item 301 instructed to be moved is added to the priority list information 11, and the display control unit 142 displays a new priority list 1 based on the priority list information 11 to which the task item 301 is added. At this time, the arrangement order of the task items 301 in the priority list information 11 is rewritten so that the task item 301 instructed to be moved is added to, for example, the lowermost portion of the priority list 1 (a position on an X2 direction side). Data of the task item 301 moved to the priority list 1 is deleted from the history list information 12.

As described above, in the present embodiment, a task item in the history list 2 can be moved to the priority list 1 by a moving operation performed by a user. In a case where the task item 301 moved from the history list 2 to the priority list 1 is deleted from the priority list 1 by the operation of the delete button 7*b*, the task item may be returned to the history list 2.

Once the operation unit 122 detects a selection operation for a task item 301 of the priority list 1 and the history list 2, the display control unit 142 displays the task execution screen 350 (see FIG. 5) on the display unit 121.

Setting items for performing various settings and a slide button 10 for executing a task are displayed in the task execution screen 350. Various settings are performed by operating the setting items. A color display portion 4 is arranged at an upper portion of the task selection screen. When displaying the task execution screen 350, the color display portion 4 has the same color as that of the color display portion 3 of the selected task item 301.

The task execution screen 350 illustrated in FIG. 5 is a task execution screen 350 in a case where a selection operation for "color copy" among the task items 301 in the task selection screen 300 illustrated in FIG. 4 is performed. The color display portion 4 of the task execution screen illustrated in FIG. 5 is displayed in the same color as that in which the color display portion 3 for "color copy" 2*a* of the task item 301 is displayed, to indicate that the copy function is selected.

In the present embodiment, an instruction operation of instructing the multi-function peripheral 100 to execute tasks for various functions is a slide operation for the slide button 10 in the task execution screen 350. Once the operation unit 122 detects the slide operation, the operation receiving unit 143 instructs the function control unit 144 to execute a task corresponding to a task item 301 selected in the task selection screen 300. The function control unit 144 controls an operation of each of the reading unit 102, the image forming unit 103, and the communication unit 104 based on this instruction, whereby a task is executed.

(Operation of Present Embodiment)

Figure 11:
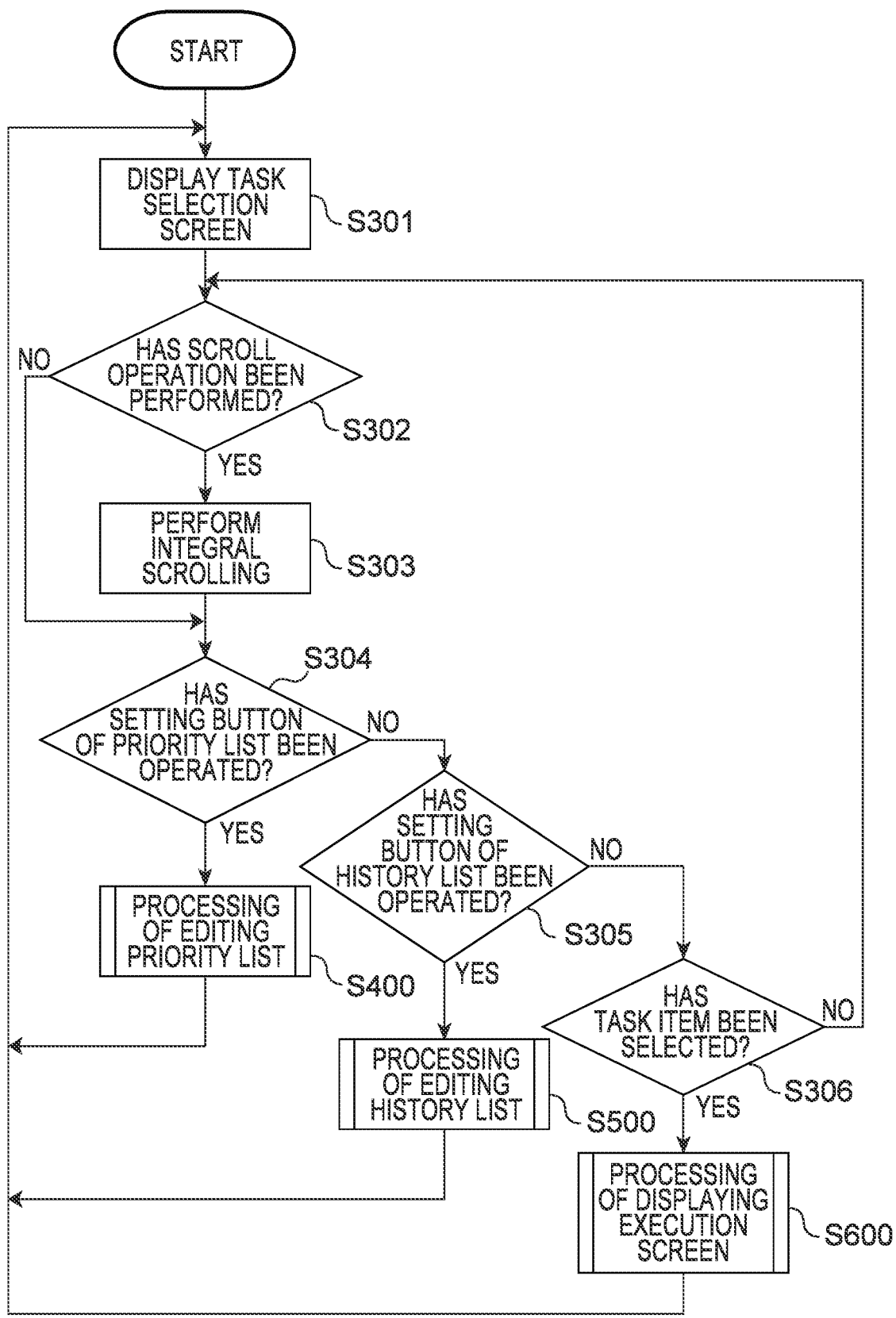
FIG. 11 is a flowchart illustrating a flow of display control processing.

Next, an example of the operation according to the present embodiment will be described. FIG. 11 is a flowchart illustrating a flow of control processing executed by the control device 110.

Once the multi-function peripheral 100 is activated by receiving power, the CPU 111 executes the control program 130 read from the storage device 113. As a result, the CPU 111 functions as the UI control unit 141 and the function control unit 144, and starts the control processing.

As illustrated in FIG. 11, as an example, the UI control unit 141 causes the display unit 121 of the touch panel display 123 to display the task selection screen 300 (see FIG. 4) as the top screen (Step S301). Specifically, the UI control unit 141 reads the priority list information 11, the history list information 12, and the UI control data 132 included in the function control data 131, and generates the task selection screen 300 including the priority list 1 and the history list 2. A plurality of task items 301 included in each of the priority list 1 and the history list 2 are displayed in the task selection screen 300.

The UI control unit 141 waits for input of a touch operation for the task selection screen 300 displayed on the display unit 121. First, in Step S302, the UI control unit 141 determines whether or not a scrolling operation for the task selection screen 300 has been performed. In a case where a task item 301 desired by a user is hidden in the task selection screen 300, the user performs a scrolling operation for the task selection screen 300 through the touch panel display 123 in order to display the hidden task item 301. The scrolling operation is, for example, a flicking operation in the direction along the arrow X1.

In a case where the scrolling operation for the task selection screen 300 has been performed (Step S302: YES), the UI control unit 141 scrolls through the task selection screen 300 (Step S303). More specifically, in Step S303, the UI control unit 141 handles the priority list 1 and the history list 2 as one integrated list, and integrally scrolls through the priority list 1 and the history list 2. For example, when a user performs the scrolling operation, both the priority list 1 and the history list 2 are scrolled regardless of whether the finger of the user touches a display region of the priority list 1 or a display region of the history list 2 on the touch panel display 123, because the priority list 1 and the history list 2 are handled as one integrated list.

As a result, for example, in a case where the scrolling direction is performed in the X1 direction in the task selection screen 300 illustrated in FIG. 4, the task items are hidden from a task item 301 arranged at the uppermost portion of the priority list 1, and instead, a hidden task item 301 positioned below a task item 301 at the lowermost portion of the history list 2 enters the display region and is displayed. As an example, the task selection screen 300 is changed from the state illustrated in FIG. 4 to the state illustrated in FIG. 6. A user searches for a desired task item 301 in the task selection screen 300 by performing such a scrolling operation.

In a case where the scrolling operation is not performed (Step S302: NO) or in a case where the scrolling operation is performed in Step S303 and then the scrolling operation is stopped, the UI control unit 141 proceeds to Step S304.

In Step S304, the UI control unit 141 determines whether or not an operation (specifically, a flicking operation or a tapping operation) for the setting button 6 of the priority list 1 has been performed. In a case where the setting button 6 of the priority list 1 has been operated (Step S304: YES), the UI control unit 141 processing of editing the priority list 1 to be described later (Step S400).

In a case where the setting button 6 of the priority list 1 is not operated (Step S304: NO), the UI control unit 141 determines whether or not an operation (specifically, a flicking operation or a tapping operation) for the setting button 8 of the history list 2 has been performed (Step S305). In a case where the setting button 8 of the history list 2 has been operated (Step S305: YES), the UI control unit 141 executes processing of editing the history list 2 to be described later (Step S500).

In a case where the setting button 8 of the history list 2 is not operated (Step S305: NO), the UI control unit 141 proceeds to Step S306.

In Step S306, the UI control unit 141 determines whether or not a selection operation for any task item 301 in the task selection screen 300 has been performed. In a case where the selection operation for any of the task items 301 has been performed (Step S306: YES), the UI control unit 141 proceeds to Step S600 and executes processing of displaying the task execution screen 350 (see FIG. 5) corresponding to the function of the selected task item 301. After executing Step S600, the UI control unit 141 returns to Step S301 and waits for input of a touch operation.

In Step S306, in a case where no task item 301 is selected (Step S306: NO), the UI control unit 141 returns to Step S302 and repeats the above-described processing.

The control processing illustrated in FIG. 11 ends, for example, in a case where the power supply of the multifunction peripheral 100 is turned off, regardless of which step is being executed.

(Processing of Editing Priority List 1)

Figure 12:
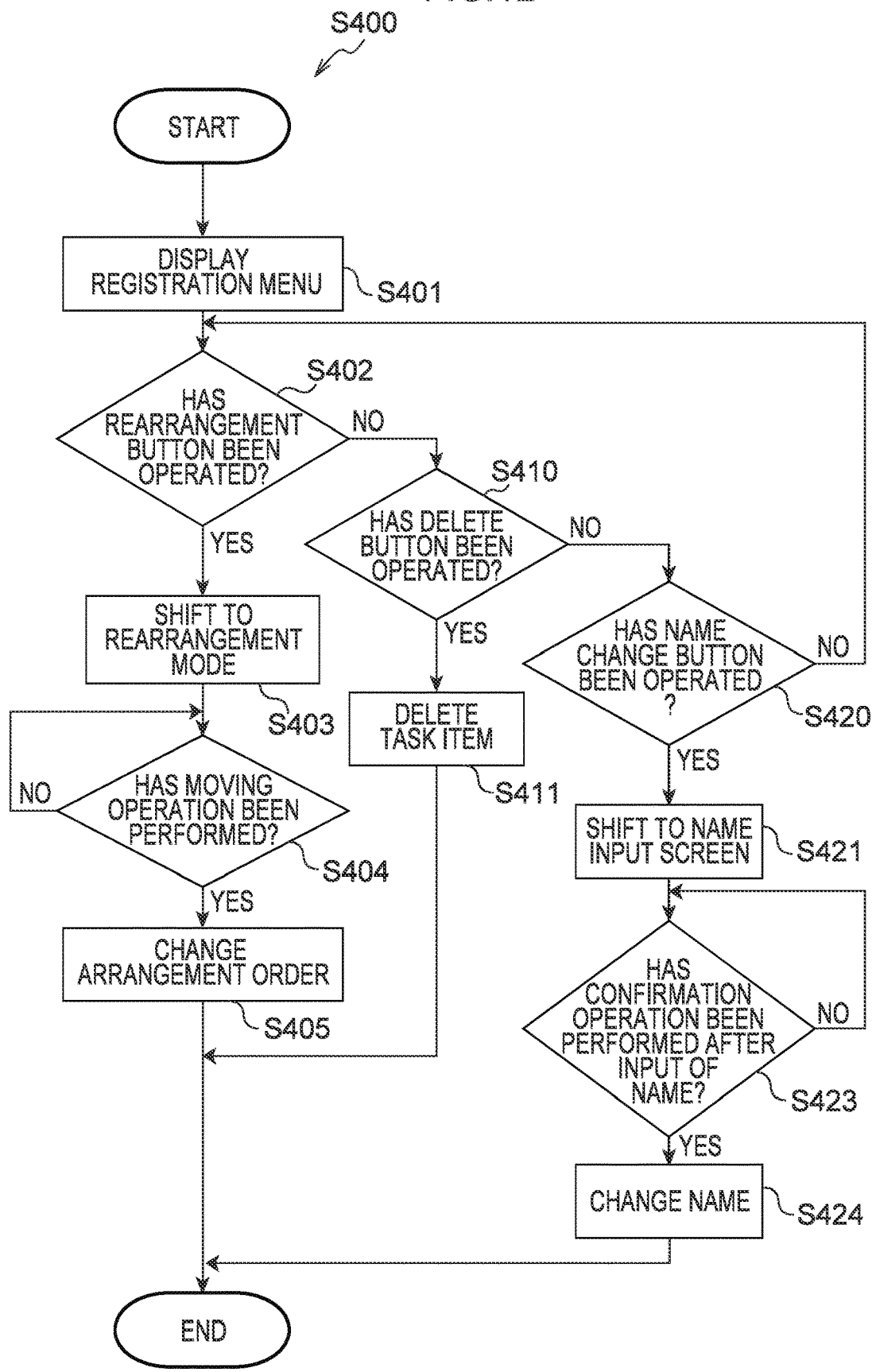
FIG. 12 is a flowchart illustrating a flow of processing of editing the priority list.

FIG. 12 is a flowchart illustrating a flow of processing of editing the priority list 1 (Step S400 in FIG. 11) executed by the control device 110.

As illustrated in FIG. 12, once the execution of the processing of editing the priority list 1 is started, the UI control unit 141 displays the registration menu 7 (see FIG. 7) in the task item 301 for which the setting button 6 has been operated (Step S401). The rearrangement button 7a, the delete button 7b, and the name change button 7c are arranged in the registration menu 7.

Next, the UI control unit 141 determines whether or not an operation (specifically, a flicking operation or a tapping operation) for the rearrangement button 7a has been performed (Step S402). In a case where the operation for the rearrangement button 7a has been performed (Step S402: YES), the UI control unit 141 shifts the task selection screen displayed on the display unit 121 to the rearrangement mode (Step S403). In Step S402, in a case where the operation for the rearrangement button 7a is not performed (Step S402: NO), the UI control unit 141 proceeds to Step S410.

Figure 8:
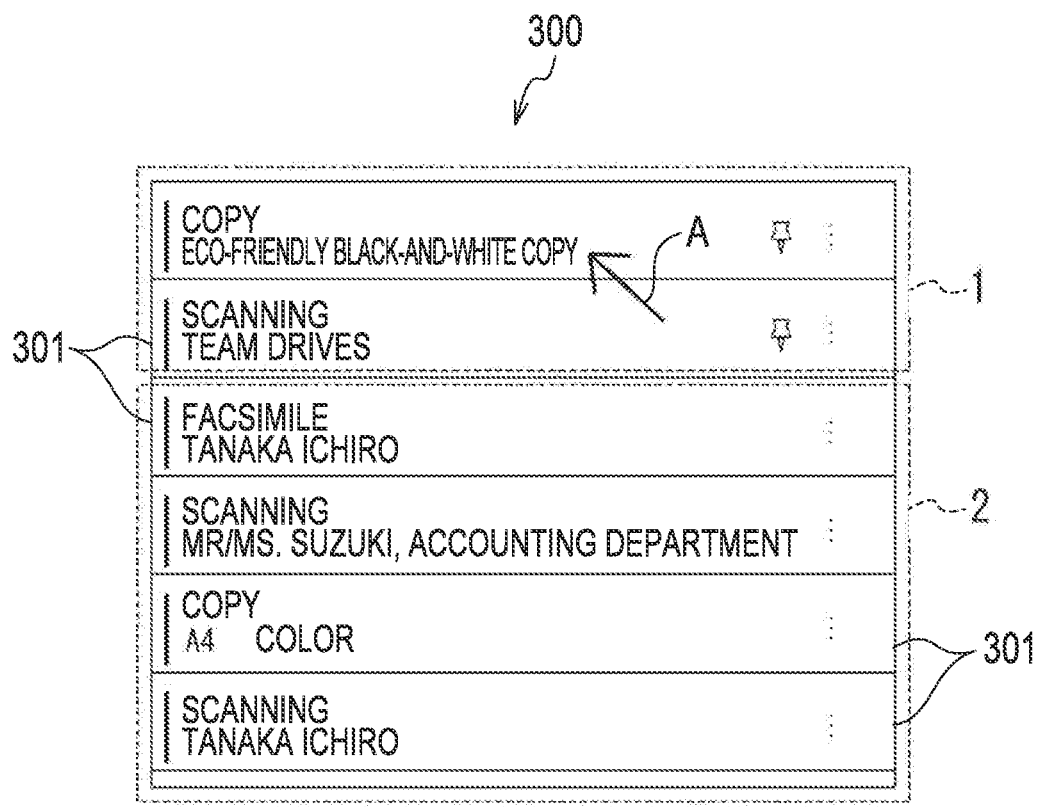
FIG. 8 is a view illustrating a screen in a rearrangement mode.

Once the task selection screen 300 shifts to the rearrangement mode, a moving operation (specifically, a dragging operation) for a task item 301 in the priority list 1 is enabled as indicated by an arrow A in FIG. 8.

Next, the UI control unit 141 determines whether or not a moving operation for a task item 301 of the priority list 1 in the task selection screen 300 has been performed in the rearrangement mode (Step S404). In a case where the moving operation for a task item 301 of the priority list 1 in the task selection screen 300 has been performed (Step S404: YES), the UI control unit 141 moves the task item 301 of the priority list 1 to change the arrangement order of the task items 301 (Step S405). In a case where the moving operation for a task item 301 of the priority list 1 in the task selection screen 300 is not detected (Step S404: NO), the UI control unit 141 repeats Step S404.

In Step S410, the UI control unit 141 determines whether or not an operation (specifically, a flicking operation or a tapping operation) for the delete button 7b has been performed (Step S410). In a case where the operation for the delete button 7b has been performed (Step S410: YES), the UI control unit 141 deletes a task item 301 of the priority list 1 (Step S411). In a case where the operation for the delete button 7b is not performed (Step S410: NO), the UI control unit 141 proceeds to Step S420.

In Step S420, the UI control unit 141 determines whether or not an operation (specifically, a flicking operation or a tapping operation) for the name change button 7c has been performed. In a case where the operation for the name change button 7c has been performed (Step S420: YES), the UI control unit 141 shifts the task selection screen 300 to the name input screen (not illustrated) (Step S421). In a case where the operation for the name change button 7c is not performed (Step S420: NO), the UI control unit 141 returns to Step S402.

Once the task selection screen 300 shifts to the name input screen (not illustrated), a new changed name can be input. Next, the UI control unit 141 determines whether or not a confirmation operation has been performed after the input of the new name in the name input screen (Step S423). In a case where the confirmation operation has been performed (Step S423: YES), the UI control unit 141 changes the name of the task item 301 of the priority list 1 (Step S424). In a case where the confirmation operation is not detected (Step S423: NO), the CPU 111 repeats Step S423.

In a case where an operation of stopping the processing has been performed in the middle of the editing processing illustrated in FIG. 12, the UI control unit 141 ends the editing processing illustrated in FIG. 12 regardless of which step is being executed. Once the editing processing illustrated in FIG. 12 ends, the UI control unit 141 returns to Step S301 in FIG. 11.

In the flowchart of FIG. 12, in the present embodiment, the processing of editing the priority list 1 (Step S400) ends after the processing of each of Step S405, Step S411, and Step S424 is completed once. However, after the processing of each of Step S405, Step S411, and Step S424 is completed once, the processing may return to Step S401 and wait for the next editing instruction.

(Processing of Editing History List 2)

Figure 13:
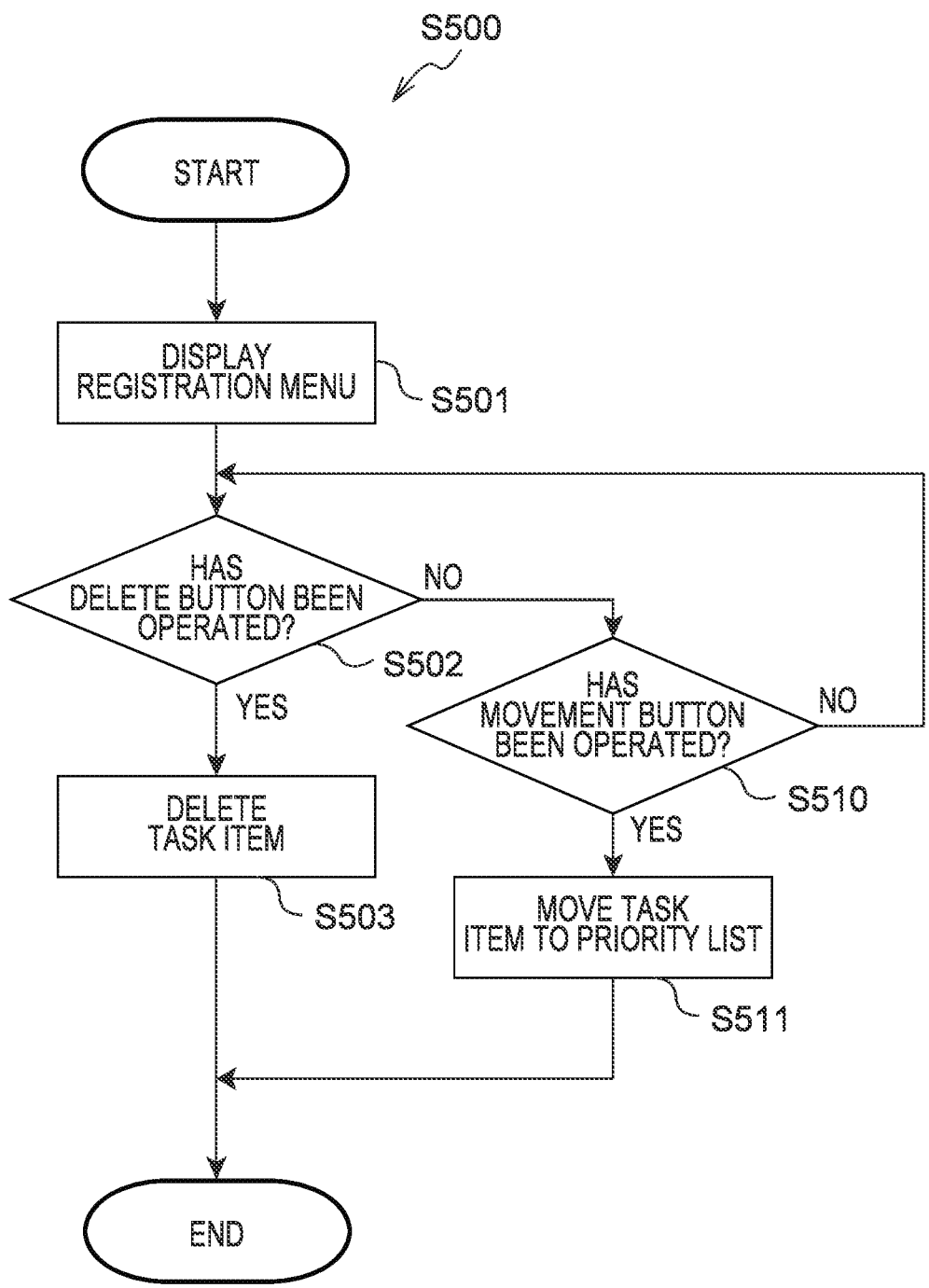
FIG. 13 is a flowchart illustrating a flow of processing of editing the history list.

FIG. 13 is a flowchart illustrating a flow of processing of editing the history list 2 (Step S500 in FIG. 11) executed by the control device 110.

As illustrated in FIG. 13, once the execution of the processing of editing the history list 2 is started, the UI control unit 141 displays the registration menu 9 (see FIG. 10) in the task item 301 for which the setting button 8 has been operated (Step S501). A delete button 9a and a movement button 9b are arranged in the registration menu 9.

Next, the UI control unit 141 determines whether or not an operation (specifically, a flicking operation or a tapping operation) for the delete button 9a has been detected (Step S502). In a case where the operation for the delete button 9a has been detected (Step S502: YES), the UI control unit 141 deletes a task item 301 of the history list 2 (Step S503). In a case where the operation for the delete button 9a is not performed (Step S502: NO), the UI control unit 141 proceeds to Step S510.

In Step S510, the UI control unit 141 determines whether or not an operation (specifically, a flicking operation or a tapping operation) for the movement button 9b has been performed. In a case where the operation for the movement button 9b has been performed (Step S510: YES), the UI control unit 141 move a task item 301 of the history list 2 to the priority list 1 (Step S511). In a case where the operation for the movement button 9b is not performed (Step S510: NO), the UI control unit 141 returns to Step S502.

In a case where an operation of stopping the processing has been performed in the middle of the editing processing illustrated in FIG. 13, the UI control unit 141 ends the editing processing illustrated in FIG. 13 regardless of which step is being executed. Once the editing processing illustrated in FIG. 13 ends, the UI control unit 141 returns to Step S301 in FIG. 11.

In the flowchart of FIG. 13, in the present embodiment, the processing of editing the history list 2 (Step S500) ends after the processing of each of Steps S503 and S511 is completed once. However, after the processing of each of Steps S503 and S511 is completed once, the processing may return to Step S501 and wait for the next editing instruction.

(Processing of Displaying Task Execution Screen 350)

Figure 14:
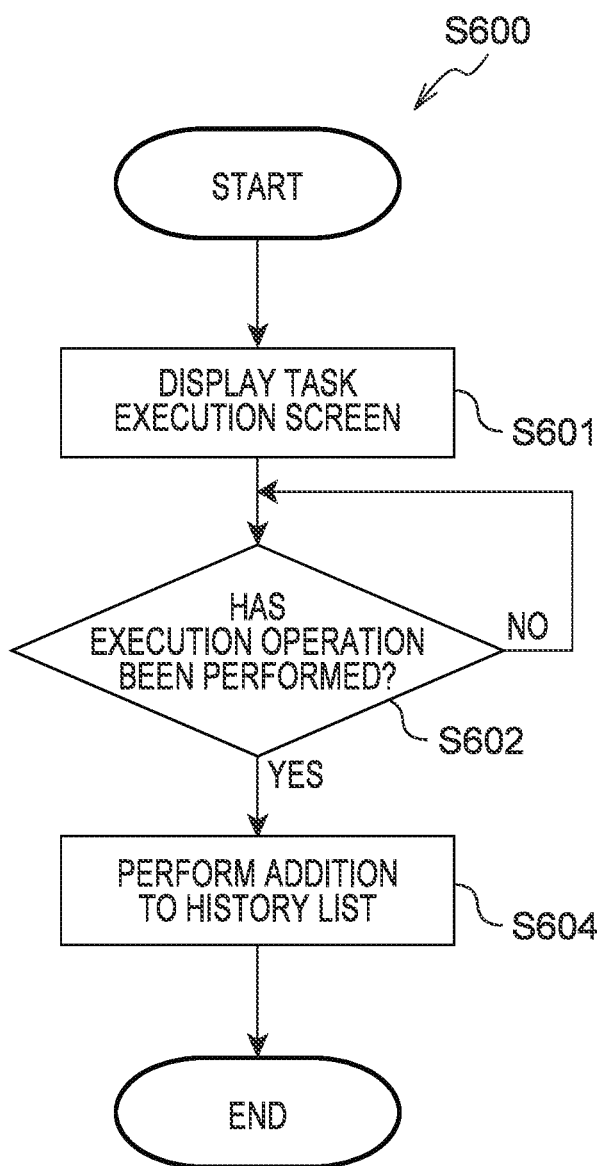
FIG. 14 is a flowchart illustrating a flow of processing of displaying the execution screen.

FIG. 14 is a flowchart illustrating a flow of processing of displaying the task execution screen 350 executed by the control device 110.

As illustrated in FIG. 14, once the execution of the processing of displaying the task execution screen 350 is started, the UI control unit 141 displays the task execution screen 350 (see FIG. 5) (Step S601).

Next, the UI control unit 141 determines whether or not an instruction operation of instructing execution of a task corresponding to the selected task item (specifically, a slide operation for the slide button 10) has been performed (Step S602). In a case where the instruction operation has been performed (Step S602: YES), the UI control unit 141 proceeds to Step S604. In a case where the instruction operation is not performed (Step S602: NO), the UI control unit 141 repeats Step S602.

In a case where the selected task has been executed, the UI control unit 141 adds the task item 301 for the executed task to the history list 2 (Step S604), and ends the processing of Step S600 illustrated in FIG. 14.

In a case where an operation of stopping the processing has been performed in the middle of the processing of Step S600 illustrated in FIG. 14, the UI control unit 141 ends the processing of Step S600 regardless of which step is being executed. Once this processing ends, the UI control unit 141 returns to Step S301 in FIG. 11.

(Operation and Effect of Present Embodiment)

As described above, in the present embodiment, in a case where the scrolling operation for the task selection screen 300 has been performed (see FIG. 4) in the task selection screen 300 (Step S302: YES), the UI control unit 141 integrally scrolls the priority list 1 and the history list 2 (Step S303). Therefore, when selecting a task item 301 in the task selection screen (see FIG. 4), it is not necessary to select whether to scroll through the priority list 1 or the history list 2.

In the present embodiment, when the priority list 1 and the history list 2 are scrolled along the arrow X1 in the task selection screen 300, the number of displayed task items 301 of the priority list 1 decreases, and the priority list 1 eventually disappears from the task selection screen 300. As a result, the display region of the history list 2 is enlarged, and the history list 2 is displayed in the entire screen. Since the number of task items 301 of the history list 2 increases accordingly, it is possible to quickly select a task item 301 from the history list 2. In a case where the number of task items 301 of the priority list 1 is large, the task items 301 of the priority list 1 can be displayed in the entire screen by scrolling. In this case, it is possible to quickly select a task item 301 from the priority list 1.

In this way, as the priority list 1 and the history list 2 are integrally scrolled, any of the priority list 1 and the history list 2 does not always keep occupying a part of the display region. Therefore, it is possible to increase the size of the display region of one of the priority list 1 and the history list 2 as compared with the related art in which the priority list 1 and the history list 2 are separately scrolled.

In the present embodiment, the plurality of task items 301 in the task selection screen 300 are task items for any of the copy function, the scanning function, the printing function, and the facsimile function. Since the task items 301 registered in the priority list 1 and the history list 2 are narrowed down to those related to the four main functions having a relatively high execution frequency in the multi-function peripheral 100, the priority list 1 and the history list 2 become easy to use for a user. At least one of the plurality of task items 301 registered in the priority list 1 or the history list 2 preferably includes a task item 301 for the copy function considered to have a relatively high execution frequency among the four main functions.

In the present embodiment, the plurality of task items 301 include task items 301 for different functions (as an example, the copy function, the scanning function, the printing function, and the like), and as an example, each task item 301 is displayed in a different color for each function in such a manner that the color display portion 3 is arranged on the left side of each task item 301 in the task selection screen 300. Therefore, since the function of the task to be executed can be intuitively grasped by the color, the color becomes a mark for task selection, and erroneous operation can be prevented.

In the present embodiment, in the processing of editing the priority list 1 (see FIG. 12), the task items 301 of the priority list 1 can be rearranged, deleted, or renamed. Therefore, a user can customize a task item 301 of the priority list 1 according to a usage situation of the user, as a result of which the operability can be improved.

In the present embodiment, a task item 301 in the priority list 1 can be initially set. Therefore, a task item 301 having a high execution frequency at the time of product shipment or the like can be included in the priority list 1. As a result, it is possible to reduce the burden of a setting work for the task item 301 on a user.

In the present embodiment, in the processing of editing the history list 2 (see FIG. 13), a task item 301 in the history list 2 can be moved to the priority list 1 or deleted.

Therefore, a user can customize task items 301 of the priority list 1 and the history list 2 according to a usage situation of the user, as a result of which the operability can be improved.

In the present embodiment, the same color as a color displayed for a task item 301 in the task selection screen is displayed in the task execution screen 350. Therefore, the function to be executed can be intuitively grasped by the color, as a result of which erroneous operation can be prevented.

In the above-described embodiments, for example, as a hardware structure of a processing unit that executes various processings such as the UI control unit 141, the display control unit 142, the operation receiving unit 143, and the function control unit 144, various processors described below can be used. Examples of the various processors include, in addition to the CPU 111 which is a general-purpose processor that functions as various processing units by executing software (program), a programmable logic device (PLD) in which a circuit configuration can be changed after manufacturing, such as a field programmable gate array (FPGA) and a dedicated circuitry which is a processor having a dedicated circuit configuration designed for executing specific processing, such as an application specific integrated circuit (ASIC).

The various processings may be executed by one of these various processors, or may be executed by a combination of two or more processors of the same type or different types (for example, a plurality of FPGAs and a combination of a CPU and an FPGA). A plurality of processing units may be implemented by one processor. As an example in which a plurality of processing units are implemented by one processor, a processor that implements a function of the entire system including a plurality of processing units with one integrated circuit (IC) chip, such as a system on chip (SoC), may be used.

As described above, the various processing units are implemented using one or more of the various processors as a hardware structure.

More specifically, a circuitry obtained by combining circuit elements such as semiconductor elements can be used as the hardware structure of these various processors.

The technology of the disclosure is also applicable to a computer-readable storage medium (a universal serial bus (USB) memory, a digital versatile disc (DVD)-read only memory (ROM), or the like) that non-transiently stores a control program of the control device, in addition to the control program of the control device.

The present invention is not limited to the above-described embodiments, and various modifications, changes, and improvements can be made without departing from the gist of the disclosure. For example, the above-described modified examples may be configured by combining a plurality of embodiments, if appropriate.

In the present embodiment, the multi-function peripheral 100 is used as an example of the information apparatus, but the technology of the disclosure is not limited thereto. Examples of the information apparatus may include a telephone line apparatus such as a mobile phone or a facsimile machine, a copier or a printer having no communication function, or the like may be used, or an image forming device other than a multi-function peripheral may be used as an example of the information apparatus.

The disclosure of Japanese Patent Application No. 2019-239029 filed on Dec. 27, 2019 is incorporated herein by reference in its entirety. All documents, patent applications, and technical standards mentioned herein are incorporated herein by reference to the same extent as if each individual document, patent application, and technical standard were specifically and individually stated.

The technology of the disclosure is capable of integrally scrolling through the priority list and the history list, and is capable of maximizing a scrolling region and displayable task items, so that a task can be quickly selected. That is, the operability of the information apparatus is enhanced, and the technology of the disclosure has industrial applicability.

A first aspect is a control device including a processor that controls display of a task selection screen which is a task selection screen for selecting one task item from a plurality of task items and in which a priority list, which is a list of preset task items, and a history list, which includes histories of task items executed in the past, are displayed in parallel, in which the processor is configured to integrally scroll through the priority list and the history list in a case in which a scrolling operation has been performed for the priority list or the history list.

A second aspect is the control apparatus according to the first aspect, in which the one task item is a task item for any of a copy function, a scanning function, a printing function or a facsimile function.

A third aspect is the control device according to the first or second aspect, in which the plurality of task items include task items for different functions, and the task item is displayed in a color different for each function at the task selection screen.

A fourth aspect is the control device according to any one of the first to third aspects, in which a setting button is arranged at the task item in the priority list, and the processor is configured to perform one or more of rearrangement of the task items in the priority list, deletion of the task item from the priority list or name change of the task item, based on an operation of the setting button.

A fifth aspect is the control device according to any one of the first to fourth aspects, in which the task item in the priority list is initially settable.

A sixth aspect is the control device according to any one of the first to third aspects, in which a setting button is arranged at the task item in the history list, and the processor is configured to perform one or more of movement to the priority list or deletion from the priority list, based on an operation of the setting button.

A seventh aspect is the control device according to the third aspect, in which in a case in which a desired task item is selected, transition is made to a task execution screen for the selected task item, and the task execution screen is displayed in the same color as a color in which the task item is displayed.

An eighth aspect is a recording medium storing a control program for causing a computer to perform processing of integrally scrolling through, in a task selection screen which is a task selection screen for selecting one task item from a plurality of task items and in which a priority list, which is a list of preset task items, and a history list, which includes histories of task items executed in the past, are displayed in parallel, the priority list and the history list in a case in which a scrolling operation has been performed for the priority list or the history list.

According to the technology of the disclosure, it is not necessary to select which of the priority list and the history list to scroll through.

What is claimed is:

1. A control device, comprising:
a processor that controls display of a task selection screen, which is a task selection screen for selecting one task item from a plurality of task items and which displays a priority list, which includes preset task items, and a history list, which includes histories of task items executed in the past, wherein the processor is configured to:
display the task items of the priority list at the task selection screen so as to be consecutively arrayed in a predetermined direction;
display the task items of the history list at the task selection screen so as to be consecutively arrayed in the predetermined direction;
display the history list at the task selection screen below the priority list; and
in a case in which a scrolling operation has been performed for the priority list in the predetermined direction, integrally scroll through both the priority list and the history list in a direction of the scrolling operation, and increase a size of a display region of one of the priority list or the history list.

2. The control device according to claim 1, wherein, in a case in which one of the task items of the priority list has been deleted, the processor displays the respective task items of the priority list and the history list so as to fill a void due to the deletion.

3. The control device according to claim 1, wherein, in a case in which one of the task items of the priority list has been deleted, the processor displays a previously non-displayed task item of the history list at the task selection screen.

4. The control device according to claim 1, wherein, in a case in which one of the task items of the priority list has been deleted, the processor displays the respective task items of the history list so as to fill a void due to the deletion.

5. The control device according to claim 1, wherein the one task item is a task item for any of a copy function, a scanning function, a printing function or a facsimile function.

6. The control device according to claim 1, wherein the processor displays a color that is different for each function of the task items on the left side of each task item at the task selection screen.

7. The control device according to claim 6, wherein, in a case in which one of the task items is selected, the processor effects a transition to a task execution screen for the selected task item, and displays, on the task execution screen, a same color as the color displayed at the task item.

8. The control device according to claim 1, wherein the processor displays, at at least one of the task items of the priority list, information indicating that display of the at least one of the task items will not be updated even when another task item is executed.

9. The control device according to claim 1, wherein, in a case in which the processor has received an instruction to add one of the task items of the history list to the priority list, the processor displays the one of the task items subject to the instruction as one of the task items of the priority list.

10. The control device according to claim 9, wherein the processor deletes, from the history list, the one of the task items that has been added to the priority list.

11. A control device, comprising:
a processor that controls display of a task selection screen which is a task selection screen for selecting one task item from a plurality of task items and in which a priority list, which is a list of preset task items, and a history list, which includes histories of task items executed in the past, are displayed in parallel, wherein the processor is configured to:
display the history list at the task selection screen at a predetermined direction side relative to the priority list;
display the task items of the priority list at the task selection screen so as to be consecutively arrayed in the predetermined direction;
display the task items of the history list at the task selection screen so as to be consecutively arrayed in the predetermined direction; and
in a case in which a scrolling operation has been performed for the priority list in the predetermined direction, integrally scroll through both the priority list and the history list in a direction of the scrolling operation, and increase a size of a display region of one of the priority list or the history list.

12. A non-transitory computer-readable storage medium storing a program executable by a computer to perform processing, at a task selection screen, which is a task selection screen for selecting one task item from a plurality of task items and which displays a priority list, which includes preset task items, and a history list, which includes histories of task items executed in the past, the processing comprising:
displaying the task items of the priority list at the task selection screen so as to be consecutively arrayed in a predetermined direction;
displaying the task items of the history list at the task selection screen so as to be consecutively arrayed in the predetermined direction;
displaying the history list at the task selection screen below the priority list; and
in a case in which a scrolling operation has been performed for the priority list in the predetermined direction, integrally scrolling through both the priority list and the history list in a direction of the scrolling operation, and increase a size of a display region of one of the priority list or the history list.

* * * * *